United States Patent Office 3,280,108
Patented Oct. 18, 1966

3,280,108
CERTAIN N,N'-(1,2-DIHYDROXYETHYLENE)-BIS-ETHYLENIMINE COMPOUNDS AND THEIR PRODUCTION
Bruno Sander, Ludwigshafen (Rhine), and Friedrich Becke, Heidelberg, Germany, assignors to Badische Anilin- & Soda-Fabrik Aktiengesellschaft, Ludwigshafen (Rhine), Germany
No Drawing. Filed Mar. 11, 1965, Ser. No. 439,089
Claims priority, application Germany, Mar. 13, 1964, B 75,894
5 Claims. (Cl. 260—239)

This invention relates to a process for the production of bisaziridines and to the substances themselves.

It is known that ethylenimine may be reacted with formaldehyde or chloral in the presence of anhydrous organic solvents to form an ethylenimine bearing a substituent on the nitrogen atom, the substituent being a methylol or a $\beta,\beta,\beta$-trichloro-$\alpha$-hydroxyethyl group.

It is further known that this reaction may also be carried out in the presence of anhydrous potassium carbonate as the catalyst. It is a disadvantage of this method that water must be excluded and therefore the initial materials must be dehydrated prior to the reaction or otherwise undesirable byproducts form.

It is an object of this invention to provide a process for the production of new bisaziridines by reacting aziridines with glyoxal. It is another object of this invention to provide a process for the production of bisaziridines in which the desired substances are obtained in very good yields. A further object of this invention is to provide the new bisaziridines themselves. Finally it is an object of this invention to provide a process for the production of bisaziridines in which aqueous initial materals may be used.

The said objects are achieved by reacting an aziridine having the general formula

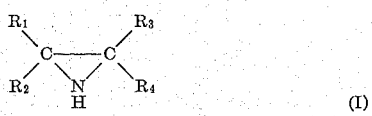

(I)

in which $R_1$, $R_2$, $R_3$ and $R_4$ may each denote a hydrogen atom or an alkyl group, with glyoxal at temperatures of from $-10°$ C. to $+80°$ C. in the presence of water and an organic solvent.

The new bisaziridines which may be prepared by the process according to this invention may be represented by the general formula:

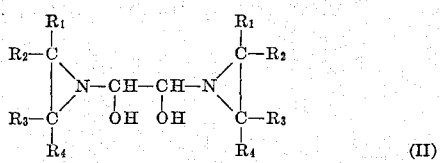

(II)

in which $R_1$, $R_2$, $R_3$ and $R_4$ have the above meanings.

The process may be represented by the following equation taking as an example the reaction of ethylenimine with glyoxal:

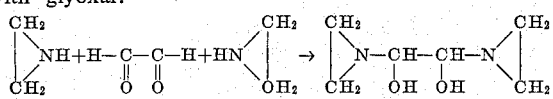

It is surprising that under the reaction conditions according to the invention it should be possible to arrive at definite monomeric compounds of simple constitution from such easily polymerisable initial materials as ethylenimine and glyoxal. It is also surprising that the reaction can be carried out in the presence of water because exclusion of water is necessary for the reaction of formaldehyde or chloral with ethylenimine.

Aziridines having the general Formula I are used as initial materials. It is preferred to use aziridines in which the radicals $R_1$ to $R_4$ denote hydrogen atoms or alkyl groups having one to four carbon atoms, at least two of the said substitutents being hydrogen.

Examples of such substances are: ethylenimine, 2-methylethylenimine, 2-ethylethylenimine, 2,2-dimethylethylenimine, 2,3-dimethylethylenimine, 2-butylethylenimine, 2-isopropyl-3-methylethylenemine, 2-ethyl-3-butylethylenimine or 2-propyl-3-butylethylenimine.

The reaction is carried out in the presence of water or aqueous organic solvents and/or suspension agents. The following are particularly suitable solvents: lower alkanols having one to four carbon atoms, such as methanol, ethanol, propanol and butanol; and cyclic five-membered to six-membered ethers, such as dioxane, tetrahydrofuran or 1,3-dimethyldioxane. Lower aliphatic ketones having three to six carbon atoms, such as methyl ethyl ketone and acetone, or N-alkyl substituted pyrrolidones whose alkyl groups contain one to four carbon atoms, for example N-methylpyrrolidone or N-ethylpyrrolidone, may also be used. The solvents and/or suspension agents may be used singly or in combination. The reaction is carried out in the presence of 0.5 to 80% preferably 5 to 40%, by weight of water with reference to the whole reaction mixture. The water may be brought into the reaction vessel in the form of aqueous initial materials and/or aqueous solvents and/or suspension agents or may be added direct to the reaction mixture.

The initial materials are as a rule used in stoichimetric amounts. One or other may however be used in excess, for example 1½ to three times excess.

The process is carried out at temperatures of from $-10°$ to $+80°$ C.; it is preferred to carry it out at room temperature, i.e. $10°$ to $30°$ C.

The usual procedure is to place the aqueous dialdehyde and the solvent in a reactor and to add the aziridine slowly at room temperature in the course of a few minutes while stirring. The reaction heat liberated is advantageously removed by external cooling. The reaction is completed after two to three hours. The desired bisaziridines separate out as a rule upon cooling. They may be separated very easily, for example by filtration, from the reaction mixture. As a rule they need not be further purified before processing.

The new compounds are valuable intermediates for the production of plastics, plasticizers and dyes.

Bisaziridines of the Formula II may be added to print pastes containing color pigments and the mixture used to print fabric, for example of cotton. Fabric thus printed has good resistance to laundering. For example, 5% by weight of N,N'-(1,2-dihydroxyethylene)-bis-ethylenimine may be added to a print paste which comprises copper phthalocyanine, a thickener emulsion of the oil-in-water type, triethanolamine and an aqueous dispersion of a copolymer of butyl acrylate, styrene and acrylic acid. Cotton cloth may be printed with this print paste, dried in a current of air at $40°$ to $60°$ C. and then aftertreated for three to five minutes at $180°$ to $200°$ C. The print obtained has good laundering resistance.

The invention is further illustrated by the following examples in which parts are parts by weight.

*Example 1*

86 parts of ethylenimine is slowly added in the course of twenty to thirty minutes while stirring to a mixture of 142 parts of a 41% aqueous glyoxal solution and 400 parts of dioxane. The heat of reaction is removed by external cooling. The desired product crystallizes out after only a few minutes. Reaction is allowed to continue for another two hours while stirring. The crystals are then suction filtered and washed with ice-cold ethanol. 140 parts of N,N'-(1,2-dihydroxyethylene)-bis-ethylenimine having a melting point of 115° to 125° C. is obtained, i.e., a yield of 97.3% of the theory with reference to glyoxal used.

*Analysis.*—$C_6H_{12}N_2O_2$—Calculated: C, 50.0%; H, 8.4%; N, 19.4%. Found: C, 49.8%; H, 8.4%; N, 19.3%.

Example 2

The procedure of Example 1 is followed but ethanol is used as solvent instead of dioxane. 116 parts of N,N'-(1,2-dihydroxyethylene)bis-ethylenimine is obtained, i.e., a yield of 80.5% of the theory with reference to glyoxal used.

Example 3

The procedure of Example 1 is followed but using methyl ethyl ketone as the solvent.

134 parts of N,N'-(1,2-dihydroxyethylene)-bis-ethylenimine is obtained, i.e., a yield of 93% of the theory with reference to glyoxal used.

Example 4

The procedure of Example 1 is followed but N-methylpyrrolidone is used as the solvent.

119 parts of N,N'(1,2-dihydroxyethylene)-bis-ethylenimine is obtained, i.e., a yield of 82.7% of the theory with reference to glyoxal used.

Example 5

The procedure of Example 1 is followed but without adding an organic solvent.

84 parts of N,N'-(1,2-dihydroxyethylene)-bis-ethylenimine is obtained, i.e., a yield of 58.3% of the theory with reference to glyoxal used.

Example 6

114 parts of 2-methylethylenimine is slowly introduced in the course of twenty to thirty minutes while stirring into a mixture of 142 parts of a 41% aqueous glyoxal solution and 400 parts of dioxane. The reaction is carried out and the product worked up as described in Example 1.

163 parts of N,N'-(1,2-dihydroxyethylene)-bis-2-methyl-ethylenimine having a melting point of 118 to 119° C. is obtained, i.e., a yield of 94.8% of the theory with reference to glyoxal used.

*Analysis.*—$C_8H_{16}N_2O_2$—Calculated: C, 55.7%; H, 9.4%; N, 16.3%. Found: C, 55.8%; H, 9.3%; N, 16.3%.

Example 7

142 parts of 2-ethylethylenimine is introduced in the course of thirty minutes while stirring into a mixture of 142 parts of a 41% aqueous glyoxal solution and 150 parts of dioxane.

About three hours later, a colorless crystal mash is precipitated. To complete the reaction, the reaction mixture is left to react for another three hours while stirring. The product is suction filtered and washed with ice-cold ethanol.

158 parts of N,N'-(1,2-dihydroxyethylene)-bis-(2-ethyl-ethylenimine) having a melting point of 84° to 85° C. is obtained, i.e., a yield of 79% of the theory with reference to glyoxal used.

*Analysis.*—$C_{10}H_{20}N_2O_2$—Calculated: C, 60.0%; H, 10.0%; N, 14.0%; O, 16.0%. Found: C, 60.0%; H, 10.1%; N, 13.8%; O, 15.8%.

We claim:

1. A bisaziridine having the formula:

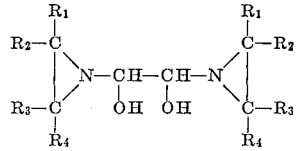

in which $R_1$, $R_2$, $R_3$ and $R_4$ are each members of the class consisting of hydrogen and alkyl of one to four carbon atoms.

2. N,N'-(1,2-dihydroxyethylene)-bis-ethylenimine.

3. N,N'-(1,2-dihydroxyethylene)-bis-2-methylethylenimine.

4. N,N'-(1,2-dihydroxyethylene)-bis-2-ethylethylenimine.

5. A process for the production of bisaziridines having the formula:

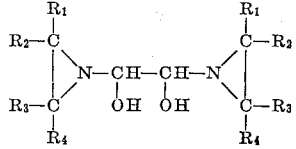

where $R_1$, $R_2$, $R_3$ and $R_4$ are each members of the class consisting of hydrogen and alkyl of one to four carbon atoms, which comprises reacting an aziridine having the formula:

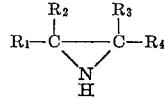

where $R_1$, $R_2$, $R_3$ and $R_4$ have the meanings given above, with glyoxal at a temperature between $-10°$ and $+80°$ C. in the presence of 0.5 to 80% by weight of water with reference to the whole reaction mixture.

No references cited.

ALEX MAZEL, *Primary Examiner.*

ALTON D. ROLLINS, *Assistant Examiner.*